(12) United States Patent
Kondo et al.

(10) Patent No.: US 12,528,236 B2
(45) Date of Patent: Jan. 20, 2026

(54) MOLDING METHOD FOR MOLDING A HYBRID MOLDED BODY

(71) Applicant: TOYOTA JIDOSHA KABUSHIKI KAISHA, Toyota (JP)

(72) Inventors: Takafumi Kondo, Nagoya (JP); Yasuhiro Ueno, Miyoshi (JP); Yuko Murata, Toyota (JP); Yuki Uchida, Nagoya (JP); Hidetoshi Yomoda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 17/646,749

(22) Filed: Jan. 3, 2022

(65) Prior Publication Data
US 2022/0242019 A1    Aug. 4, 2022

(30) Foreign Application Priority Data

Feb. 2, 2021   (JP) ................. 2021-014784

(51) Int. Cl.
*B29C 45/14*    (2006.01)
*B29K 105/08*   (2006.01)

(52) U.S. Cl.
CPC .... *B29C 45/14336* (2013.01); *B29C 45/1418* (2013.01); *B29K 2105/0872* (2013.01); *B29K 2713/02* (2013.01)

(58) Field of Classification Search
CPC ............................................. B29C 45/14336
See application file for complete search history.

(56) References Cited

U.S. PATENT DOCUMENTS

| 2013/0242487 A1* | 9/2013 | Fujioka ............... B29C 70/46 |
| | | 361/679.01 |
| 2015/0204435 A1 | 7/2015 | Kunishima |
| 2016/0354983 A1 | 12/2016 | Kakimoto et al. |
| 2020/0061952 A1 | 2/2020 | Nakayama et al. |

FOREIGN PATENT DOCUMENTS

| EP | 2047983 | * | 9/2016 |
| JP | H03153343 | * | 7/1991 |
| JP | 2012-240276 A | | 12/2012 |
| JP | 2013-006389 A | | 1/2013 |
| JP | 2013-220550 A | | 10/2013 |
| JP | 2014-148124 A | | 8/2014 |
| JP | 2014-240191 A | | 12/2014 |
| JP | 2015-137013 A | | 7/2015 |
| JP | 2016078376 | * | 5/2016 |

(Continued)

OTHER PUBLICATIONS

English machine translation of JP2016078376 as found on Google patents. (Year: 2024).*

(Continued)

*Primary Examiner* — Edmund H Lee
(74) *Attorney, Agent, or Firm* — Oblon, McClelland, Maier & Neustadt, L.L.P.

(57) ABSTRACT

A hybrid molded body according to this embodiment is a hybrid molded body in which a prepreg made of a fiber reinforced plastic and a resin are integrally molded, and the resin includes a covering part that covers at least a part of the prepreg in the boundary part of the prepreg and the resin.

3 Claims, 12 Drawing Sheets

(56) References Cited

FOREIGN PATENT DOCUMENTS

| | | | |
|---|---|---|---|
| JP | 5943777 | * | 7/2016 |
| JP | 2016-150547 A | | 8/2016 |
| JP | 2016-196115 A | | 11/2016 |
| KR | 2018-0109508 A | | 10/2018 |
| TW | 200924956 | * | 9/1997 |
| WO | WO 2015/125854 A1 | | 8/2015 |
| WO | WO 2020/202903 A1 | | 10/2020 |

OTHER PUBLICATIONS

Quality Performs, Lanxess Energizing Chemistry, Information for processors X Tepex, High Performance Materials, Edition: Oct. 2017, 27 pages.

"Foundations of Chemical Equipment Design", Writegroup of Chemical Equipment Design Foundations, Shanghai Technical Press, Jun. 1987, p. 28 (with English translation of Chinese Office Action dated Sep. 23, 2024 issued in application No. 202210108245.0 as Brief English description of relevancy).

* cited by examiner

MOLDING METHOD FOR MOLDING A HYBRID MOLDED BODY

CROSS REFERENCE TO RELATED APPLICATIONS

This application is based upon and claims the benefit of priority from Japanese patent application No. 2021-014784, filed on Feb. 2, 2021, the disclosure of which is incorporated herein in its entirety by reference.

BACKGROUND

The present disclosure relates to a hybrid molded body, a molding apparatus, and a molding method.

Japanese Unexamined Patent Application Publication No. 2016-196115 discloses a hybrid molding method including placing a press material on a gate of a lower mold, moving an upper mold toward a lower mold, and injecting an injection material from the gate just before or at the same time the upper mold reaches the bottom dead center in order to couple the press material press-molded with the lower mold and the upper mold with the injection material injection-molded.

SUMMARY

The present inventors have found the following problem with regard to a hybrid molded body, a molding apparatus, and a molding method. In the hybrid molded body formed by the molding method disclosed in Japanese Unexamined Patent Application Publication No. 2016-196115, the structure of the bonding part of the press material such as a prepreg and the injection material such as a resin is a butted structure. Fibers in an end part of fiber reinforced plastics having a shape of a continuous fiber reinforced sheet that forms a prepreg may ravel. In this state, it is thus possible that the resin cannot be completely injected (i.e. filled) and a desired bonding strength may not be obtained at a bonding part, which is a boundary part of the prepreg and the resin. As a result, it is possible that leakage paths such as cracks may occur starting from the boundary part of the prepreg and the resin due to an application of external force or shear stress generated thereon.

The present disclosure has been made in view of the aforementioned problem and provides a hybrid molded body, a molding apparatus, and a molding method capable of preventing leakage paths from occurring in the boundary part of the prepreg and the resin.

A hybrid molded body according to one aspect of the present disclosure is a hybrid molded body in which a prepreg made of a fiber reinforced plastic and a resin are integrally molded, in which the resin includes a covering part that covers at least a part of the prepreg in a boundary part of the prepreg and the resin.

In the hybrid molded body according to one aspect of the present disclosure, in the boundary part of the prepreg and the resin, the resin includes the covering part that covers at least a part of the prepreg. With this configuration, it is possible to cover a butted part of the prepreg and the resin, and to prevent leakage paths from occurring in the boundary part of the prepreg and the resin due to a shear force generated in the boundary part of the prepreg and the resin even when an external force has been applied or a shear stress has occurred in the boundary part of the prepreg and the resin.

The covering part has a width equal to or larger than an amount of displacement of the prepreg, and the width and the thickness of the covering part may be such that a shear strength in the boundary part of the prepreg and the resin becomes equal to or larger than a shear stress. With this configuration, it is possible to cause the covering part to be able to definitely cover the prepreg and to prevent leakage paths from occurring in the boundary part of the prepreg and the resin.

A molding apparatus to mold a hybrid molded body according to one aspect of the present disclosure includes a first die and a second die configured to press the prepreg, in which at least one of a surface of the first die opposed to the second die and a surface of the second die opposed to the first die includes a recessed part for molding the covering part.

In the molding apparatus configured to mold the hybrid molded body according to one aspect of the present disclosure, at least one of the surface of the first die opposed to the second die and the surface of the second die opposed to the first die includes the recessed part for molding the covering part. With the above configuration, it is possible to mold a hybrid molded body including the covering part in the boundary part of the prepreg and the resin. Accordingly, it is possible to prevent leakage paths from occurring in the boundary part of the prepreg and the resin.

At least one of the first die and the second die may include injector that injects the resin. With this configuration, the covering part can be molded in one of a surface of the first die and a surface of the second die or both the surface of the first die and the surface of the second die.

A molding apparatus to mold a hybrid molded body according to one aspect of the present disclosure includes:
a first die including injector that injects the resin; and
a second die on which the prepreg is placed,
in which the injector starts injection of the resin onto the prepreg when a gap between the first die and the second die becomes a predetermined gap.

In the molding apparatus configured to mold the hybrid molded body according to one aspect of the present disclosure, injector starts injecting the resin onto the prepreg when the gap between the first die and the second die becomes a predetermined gap. Since the entire prepreg is covered with the resin, it is possible to cover the boundary part of the prepreg and the resin. It is therefore possible to prevent leakage paths from occurring in the boundary part of the prepreg and the resin.

A molding method for molding a hybrid molded body according to one aspect of the present disclosure is a molding method for molding the hybrid molded body by integrally molding a prepreg and a resin, in which the resin is injected, in a boundary part of the prepreg that has been press-molded and the resin, in such a manner that the resin covers at least a part of the prepreg, whereby the hybrid molded body is molded.

In the molding method for molding the hybrid molded body according to one aspect of the present disclosure, in the boundary part of the prepreg that has been press-molded and the resin, the resin is injected in such a manner that the resin covers at least a part of the prepreg, whereby the hybrid molded body is molded. Accordingly, it is possible to prevent leakage paths from occurring in the boundary part of the prepreg and the resin.

A molding for molding a hybrid molded body according to one aspect of the present disclosure includes a process of causing a first die to be relatively made to move close to a second die in which the prepreg is arranged, and when a gap between the first die and the second die becomes a predetermined gap, injecting the resin to mold the hybrid molded body.

In the molding method for molding the hybrid molded body according to one aspect of the present disclosure, the first die is relatively made to move close to the second die in which the prepreg is arranged, and when the gap between the first die and the second die becomes a predetermined gap, the resin is injected and the hybrid molded body is molded. Since the entire prepreg is covered with the resin, it is possible to cover the boundary part of the prepreg and the resin. Accordingly, it is possible to prevent leakage paths from occurring in the boundary part of the prepreg and the resin.

A molding method for molding a hybrid molded body according to one aspect of the present disclosure includes:

a process of causing a first die to be relatively made to move close to a second die in which the prepreg is arranged, thereby pressing the prepreg; and a process of moving, after the pressing, the first die in a direction relatively spaced away from the second die, and when a gap between the first die and the second die becomes a predetermined gap, injecting the resin to mold the hybrid molded body.

In the molding method for molding the hybrid molded body according to one aspect of the present disclosure, after the pressing, the first die is moved in a direction relatively spaced away from the second die, and when the gap between the first die and the second die becomes a predetermined gap, the resin is injected and the hybrid molded body is molded. Since the entire prepreg is covered with the resin, it is possible to cover the boundary part of the prepreg and the resin. Accordingly, it is possible to prevent leakage paths from occurring in the boundary part of the prepreg and the resin.

According to the present disclosure, it is possible to provide a hybrid molded body, a molding apparatus, and a molding method capable of preventing leakage paths from occurring in the boundary part of the prepreg and the resin.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
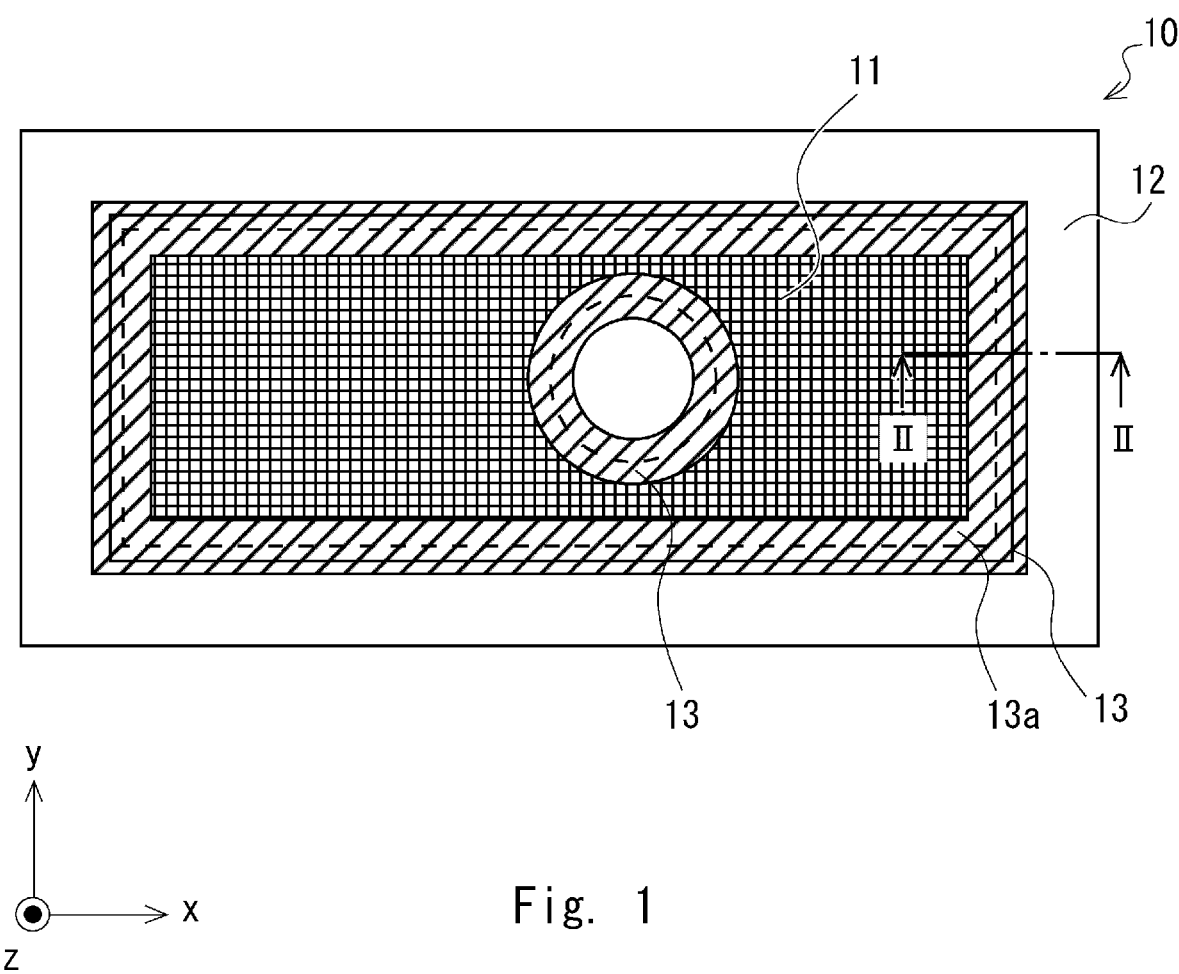
FIG. 1 is a plan view showing a hybrid molded body according to a first embodiment.

Hereinafter, with reference to the drawings, specific embodiments of the present disclosure will be described in detail.

The right-handed xyz-coordinate system shown in the drawings is used for the sake of convenience to illustrate a positional relationship among components. Unless otherwise noted, the z-axis positive direction indicates a vertical upward direction. Further, the xy-plane is a horizontal plane. The hybrid molded body herein can be used, for example, as a battery case component.

First Embodiment

First, with reference to FIGS. 1 and 2, a hybrid molded body according to this embodiment will be described. Next, with reference to FIG. 3, a hybrid molding apparatus according to this embodiment will be described. Further, with reference to FIGS. 4 and 5, a method of molding a hybrid molded body according to this embodiment will be described.

FIG. 1 is a plan view showing a hybrid molded body according to a first embodiment. Note that the hatching shown in FIG. 1 is for the purpose of clearly showing each of the components, and is not intended to indicate a cross-sectional view thereof.

As shown in FIG. 1, a hybrid molded body 10 is a molded body in which a prepreg 11 made of a fiber reinforced plastic and a resin 12 are integrally molded. In a boundary part of the prepreg 11 and the resin 12, the resin 12 includes a covering part 13a that covers at least a part of the prepreg 11. The covering part 13a is a part of a covering body 13. The details of the covering body 13 and the covering part 13a will be described later with reference to FIG. 2. In FIG. 1, the prepreg 11 is shown by the lattice hatching and the covering body 13 and the covering part 13a are shown by right upward diagonal lines.

The prepreg 11 is a continuous fiber reinforced sheet in which a thermoplastic resin or a thermosetting resin is impregnated into carbon fiber reinforced plastics (CFRP) or glass fiber reinforced plastics (GFRP), which a kind of fiber reinforced plastics. The resin 12 is a thermoplastic resin such as acrylic resin, polyethylene, polypropylene, polyvinyl chloride, or polystyrene. The prepreg 11, which is processed into any desired shape, is formed by pressing. The resin 12 is molded by injection molding. That is, the hybrid molded body 10 is molded by pressing and injection molding in a hybrid manner.

Figure 2:
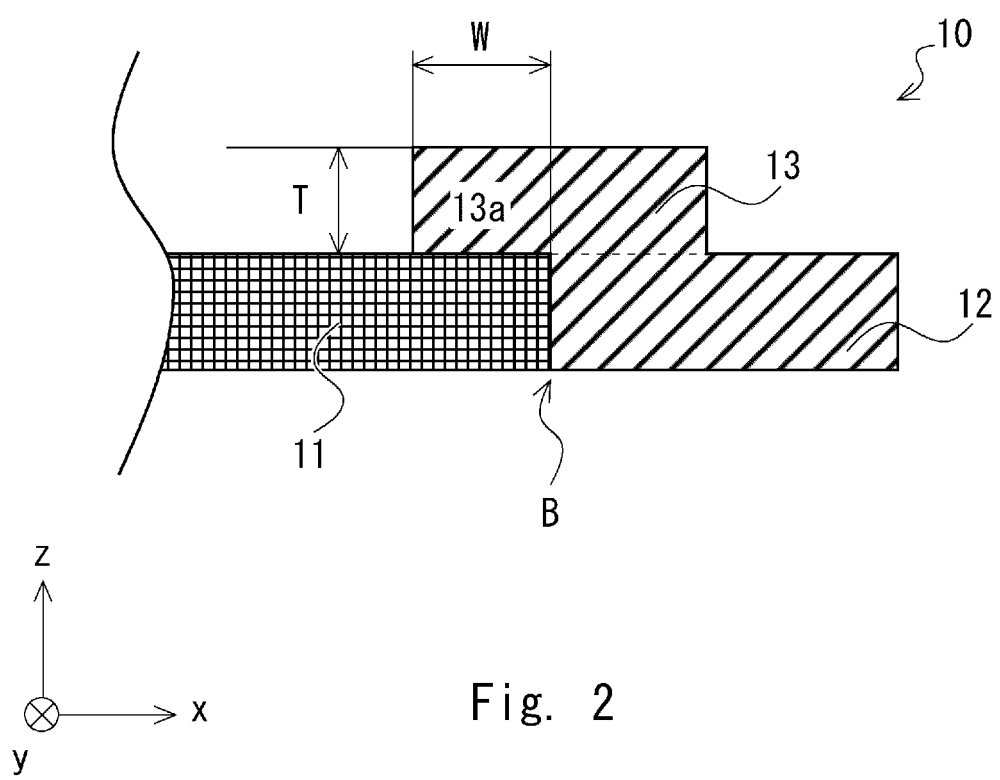
FIG. 2 is a cross-sectional view taken along the line II-II of FIG. 1.

FIG. 2 is a cross-sectional view taken along the line II-II of FIG. 1. As shown in FIG. 2, a bonding surface B of the prepreg 11 and the resin 12 has a butted structure. The covering body 13 is a part of the resin 12. The covering body 13 is provided so as to be protruded in the z-axis positive direction from the xy-plane of the prepreg 11 and the resin 12 on the z-axis positive side. The covering part 13a included in the covering body 13 covers at least a part of the xy-plane of the prepreg 11 on the z-axis positive side. That is, the butted part of the bonding surface B of the prepreg 11 and the resin 12 is covered with the covering body 13.

As shown in FIG. 2, a width W of the covering part 13a is such that it becomes equal to or larger than an amount of displacement of the prepreg 11. The amount of displacement here indicates an amount of displacement of the prepreg 11 in the xy-plane direction when it is arranged in the molding apparatus at the time of molding of the hybrid molded body 10 according to this embodiment. The details thereof will be described later with reference to FIG. 3. In the hybrid molded body 10 according to this embodiment, as one example, when the amount of displacement is ±10 mm, the width W of the covering part 13a may be 11 mm and a thickness T thereof may be 3 mm. However, this is merely one example.

The definition of the width W and the thickness T of the covering part 13a shown in FIG. 2 will be described. The width W and the thickness T of the covering part 13a shown in FIG. 2 are such that a shear strength in the boundary part of the prepreg 11 and the resin 12 becomes equal to or larger than shear stress. Here, the shear strength in the boundary part of the prepreg 11 and the resin 12 is changed depending on the strength that the materials of the prepreg 11 and the resin 12 have and the width W and the thickness T of the covering part 13a. A value obtained by dividing the shear force that is generated by applying the tensile strength in the x-axis positive direction and negative direction to the hybrid molded body 10 by the area of the boundary part of the prepreg 11 and the covering part 13a is the shear stress. The width W and the thickness T of the covering part 13a are set in such a way that the shear stress≤the shear strength is satisfied.

Further, the thickness T can be defined as follows. When the resin 12 is injected at the time of molding of the hybrid molded body 10 according to this embodiment, the resin 12 may enter the xy-plane of the prepreg 11 on the z-axis negative side due to the injection force. The thickness T of the covering part 13a may have such a thickness that the prepreg 11 is not protruded from the xy-plane of the covering part 13a on the z-axis positive side even when the resin 12 enters the xy-plane of the prepreg 11 on the z-axis negative side and the prepreg 11 is lifted toward the z-axis positive direction by the resin 12.

Further, the place where the covering part 13a is provided may be determined in advance using computer simulation such as Computer Aided Engineering (CAE). For example, the place of the hybrid molded body 10 where the shear stress may occur may be specified in advance using CAE and the covering part 13a may be provided only in this place.

While the shape of the covering body 13 other than the covering part 13a has a rectangular shape in a frontal cross sectional view in FIG. 2, it can be any shape as long as it is protruded in the z-axis positive direction from the xy-plane of the prepreg 11 and the resin 12 on the z-axis positive side. Specifically, for example, this shape may be a triangular shape in a frontal cross sectional view in such a way that it is protruded with a slope toward the right end of the covering part 13a from the xy-plane of the resin 12 on the z-axis positive side. Further, the corner part of the covering part 13a in a rectangular shape in a frontal cross sectional view may be rounded.

As described above, the hybrid molded body according to this embodiment is able to cover the butted part of the prepreg and the resin, and to prevent leakage paths from occurring in the boundary part of the prepreg and the resin due to a shear force generated in the boundary part of the prepreg and the resin even when an external force has been applied or a shear stress has occurred in the boundary part of the prepreg and the resin. Further, the hybrid molded body according to this embodiment is able to cover the butted part of the prepreg and the resin, whereby airtightness can be improved.

Further, the width of the covering part of the hybrid molded body according to this embodiment is equal to or larger than the amount of displacement of the prepreg, and the width and the thickness of the covering part may be such that the shear strength in the boundary part of the prepreg and the resin becomes equal to or larger than the shear stress. With this configuration, it is possible to cause the covering part to be able to definitely cover the prepreg and to prevent leakage paths from occurring in the boundary part of the prepreg and the resin.

Figure 3:
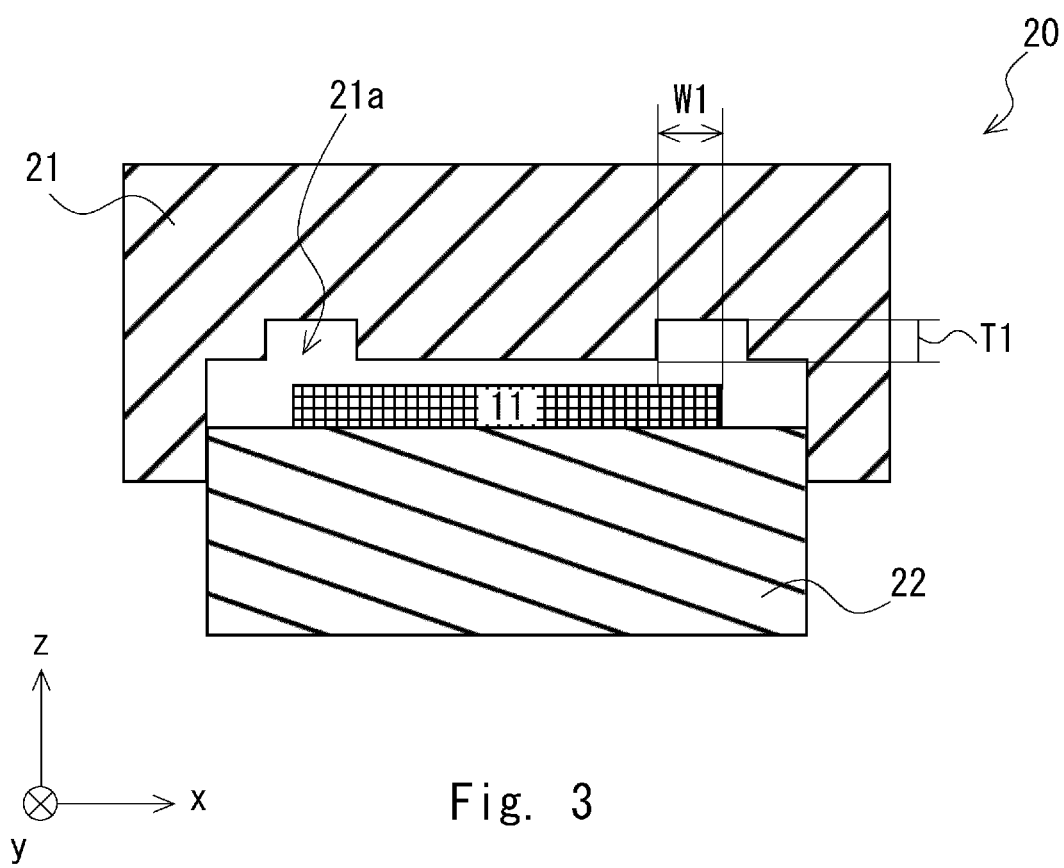
FIG. 3 is a front cross-sectional view showing a hybrid molding apparatus according to the first embodiment.

Referring next to FIG. 3, the hybrid molding apparatus according to this embodiment will be described. FIG. 3 is a front cross-sectional view showing the hybrid molding apparatus according to the first embodiment.

As shown in FIG. 3, a hybrid molding apparatus 20 according to this embodiment includes a first die 21 and a second die 22 that press the prepreg 11. While the xy-plane of the first die 21 on the z-axis negative side includes a recessed part 21a for molding the covering part 13a shown in FIG. 2 in FIG. 3, this is merely an example. For example, the xy-plane of the second die 22 on the z-axis positive side may include a recessed part for molding the covering part 13a or both the first die 21 and the second die 22 may include the recessed part. In other words, in the molding apparatus 20 according to this embodiment, at least one of surfaces where the first die 21 and the second die 22 are opposed to each other, that is, the surface of the first die 21 that is opposed to the second die 22 and the surface of the second die 22 opposed to the first die 21 includes a recessed part for molding the covering part 13a.

Incidentally, when the prepreg 11 is arranged in a desired position on the second die 22, a displacement of the prepreg 11 may occur in the direction of the xy-plane from a desired position. The amount of displacement that is assumed can be obtained by CAE. A width W1 is set in such a way that the recessed part 21a is able to cover the prepreg 11 even when the amount of displacement of the prepreg 11 that is assumed becomes a maximum. This width W1 is such that it coincides with the width W of the covering part 13a shown in FIG. 2. Further, a height T1 of the recessed part 21a is such that it coincides with a height T of the covering part 13a shown in FIG. 2. Further, in the hybrid molding apparatus 20 according to this embodiment, at least one of the first die 21 and the second die 22 may include injector that injects the resin 12 (not shown).

As described above, in the hybrid molding apparatus according to this embodiment, at least one of the surface of the first die opposed to the second die and the surface of the second die opposed to the first die includes the recessed part for molding the covering part. With this configuration, it is possible to mold a hybrid molded body including the covering part in the boundary part of the prepreg and the resin. Accordingly, it is possible to prevent leakage paths from occurring in the boundary part of the prepreg and the resin.

Further, at least one of the first die and the second die may include injector that injects the resin. With this configuration, the covering part can be formed in one of a surface of the first die and a surface of the second die or both the surface of the first die and the surface of the second die.

Figure 4:
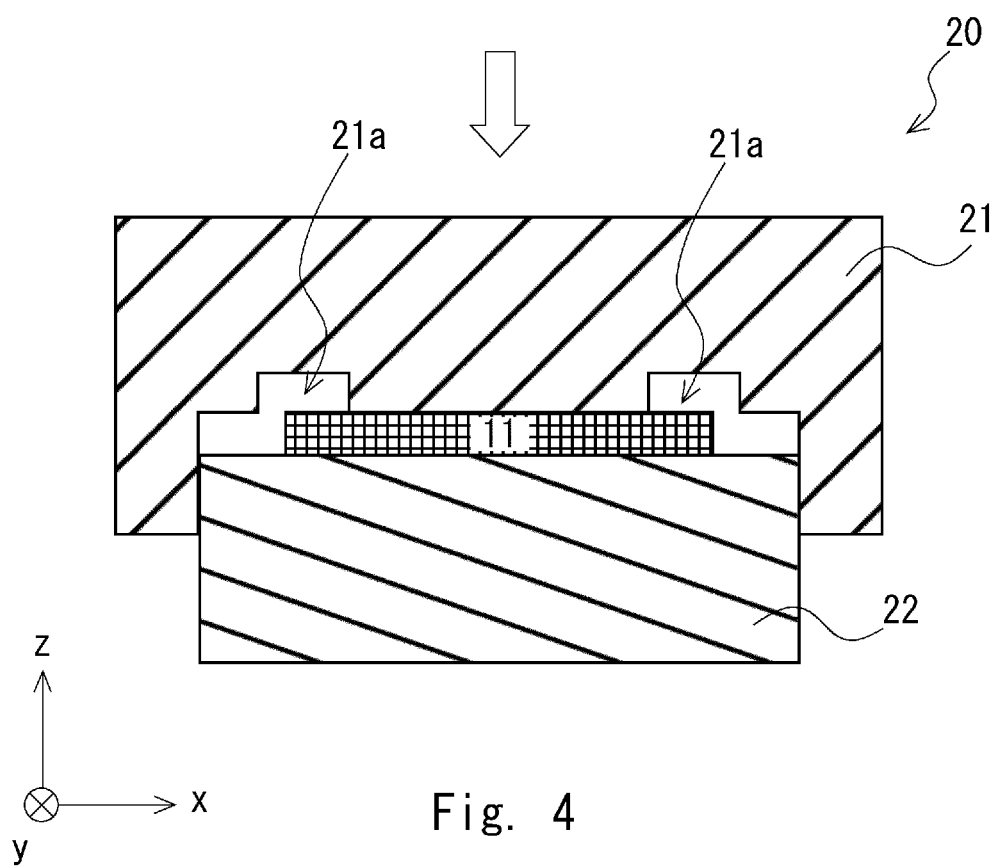
FIG. 4 is a diagram showing an operation of the hybrid molding apparatus according to the first embodiment.
Figure 5:
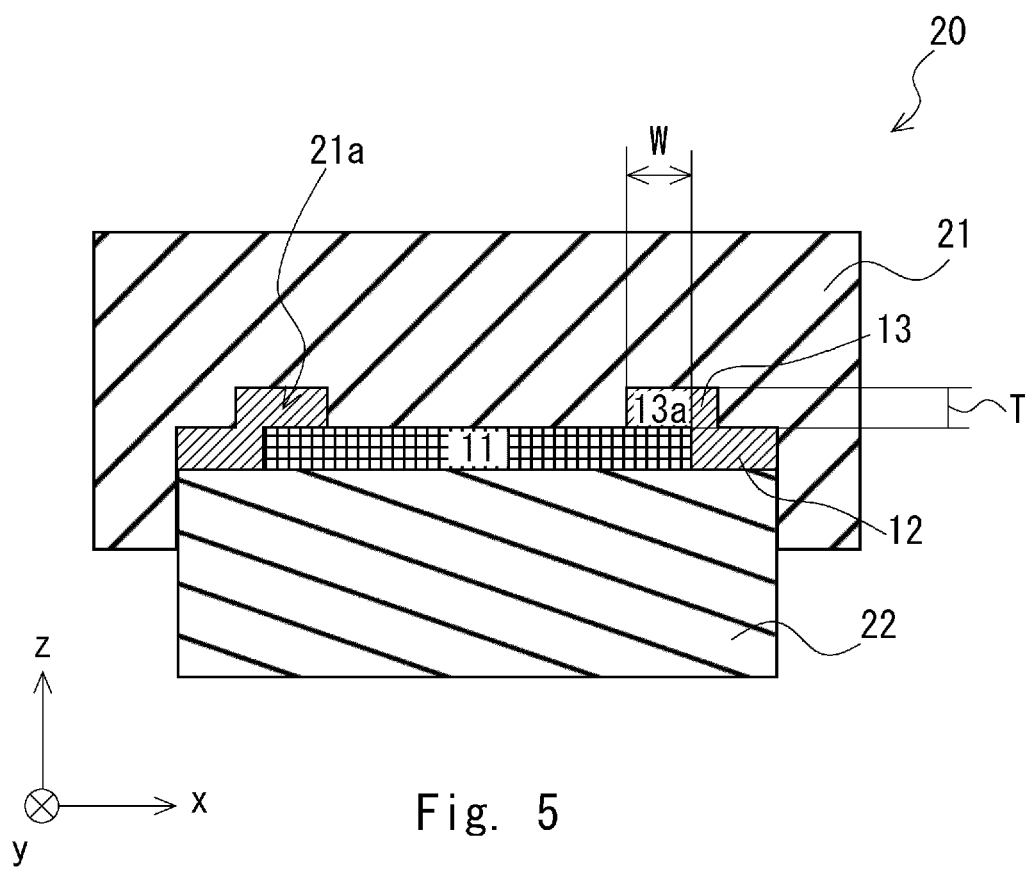
FIG. 5 is a diagram showing an operation of the hybrid molding apparatus according to the first embodiment.

Referring to FIGS. 4 and 5, a method of molding a hybrid molded body will be described. FIGS. 4 and 5 are diagrams showing an operation of the hybrid molding apparatus according to the first embodiment. As shown in FIG. 4, the first die 21 is moved in a direction in which it approaches the second die 22 (z-axis negative direction, indicated by the outline arrow), and the prepreg 11 is pressed into a desired shape.

Next, as shown in FIG. 5, in the boundary part of the prepreg 11 and the resin 12, the resin 12 is injected from the injector so that the resin 12 covers at least a part of the prepreg 11. Note that the resin 12, which is in a molten state when it is injected, is cured after a space between the first die 21 and the second die 22 is filled with the resin 12. In this way, the covering body 13 including the covering part 13a is formed in the recessed part 21a, whereby the hybrid molded body 10 according to this embodiment as shown in FIG. 2 is molded.

In the above manner, according to the method of molding the hybrid molded body according to this embodiment, in the boundary part of the prepreg that has been press-molded and the resin, the resin is injected in such a manner that the resin covers at least a part of the prepreg, whereby the hybrid molded body is molded. Accordingly, it is possible to prevent leakage paths from occurring in the boundary part of the prepreg and the resin.

Second Embodiment

Figure 6:
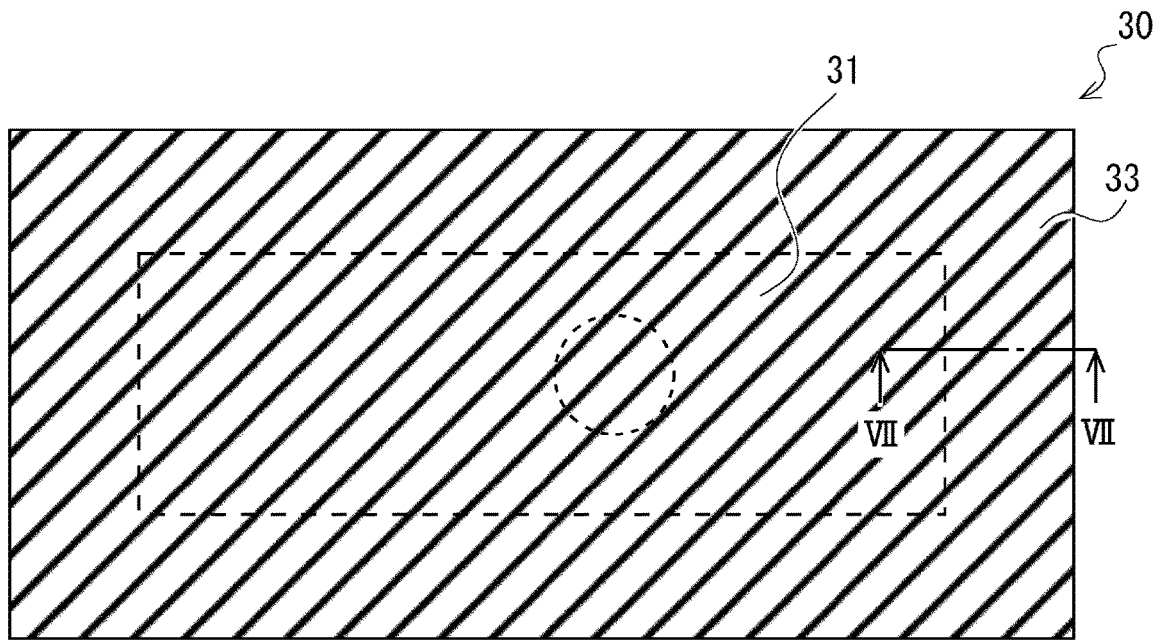
FIG. 6 is a plan view showing a hybrid molded body according to a second embodiment.
Figure 7:
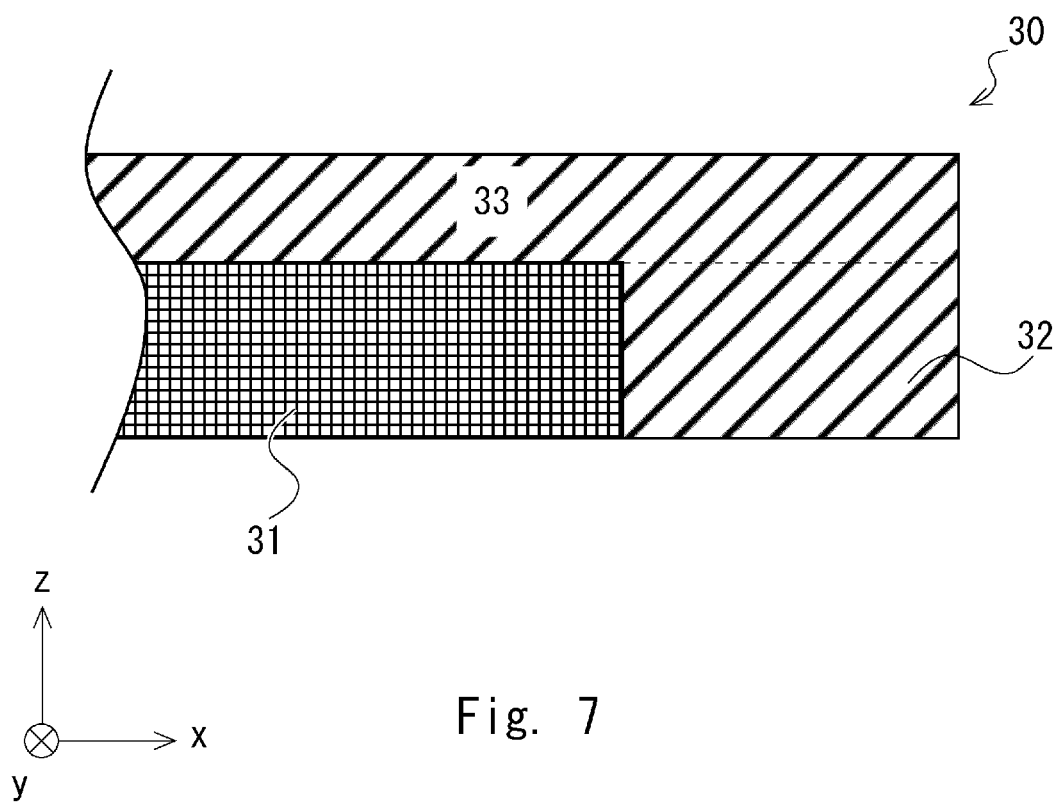
FIG. 7 is a cross-sectional view taken along the line VII-VII of FIG. 6.

Referring next to FIGS. 6 and 7, a hybrid molded body according to this embodiment will be described. Next, with reference to FIG. 8, a hybrid molding apparatus according to this embodiment will be described. Further, with reference to FIG. 9, a method of molding the hybrid molded body according to this embodiment will be described.

FIG. 6 is a plan view showing the hybrid molded body according to the second embodiment. Note that the hatching shown in FIG. 6 is for the purpose of clearly showing each of the components, and is not intended to indicate a cross-sectional view thereof. The hybrid molded body 30 according to this embodiment is different from the hybrid molded body 10 according to the first embodiment shown in FIG. 1 in that a prepreg 31 is not pressed and different in the shape of a covering part 33. Since the materials that form the prepreg 31 and a resin 32 of the hybrid molded body 30 are similar to those of the first embodiment, the descriptions thereof will be omitted here.

As shown in FIG. 6, the hybrid molded body 30 is a molded body in which the prepreg 31 made of a fiber reinforced plastic and the resin 32 are integrally molded. The prepreg 31 is not pressed. The resin 32 includes the covering part 33 that covers the entire prepreg 31 (shown by the right upward diagonal lines).

FIG. 7 is a cross-sectional view taken along the line VII-VII of FIG. 6. As shown in FIG. 7, the covering part 33, which is a part of the resin 32, covers the entire xy-plane of the prepreg 31 on the z-axis positive side.

As described above, in the hybrid molded body according to this embodiment, the whole prepreg is covered with the resin, whereby it is possible to cover the boundary part of the prepreg and the resin. Accordingly, it is possible to prevent leakage paths from occurring in the boundary part of the prepreg and the resin.

Figure 8:
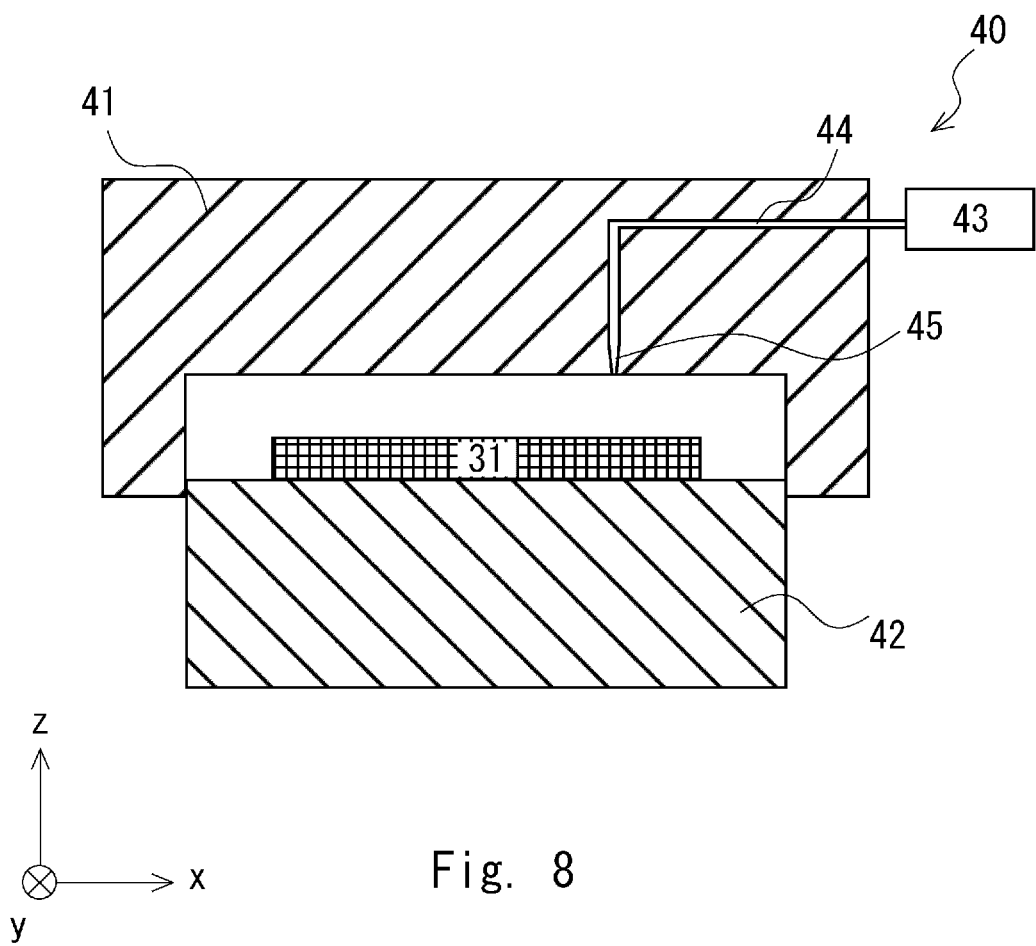
FIG. 8 is a front cross-sectional view showing a hybrid molding apparatus according to the second embodiment.

Referring next to FIG. 8, the hybrid molding apparatus according to this embodiment will be described. FIG. 8 is a front cross-sectional view showing a hybrid molding apparatus 40 according to the second embodiment. The difference between the first embodiment and the second embodiment is that injector 43 is provided only in a first die 41 in the hybrid molding apparatus 40 according to this embodiment.

As shown in FIG. 8, the first die 41 includes the injector 43 that injects a resin 32. A prepreg 31 is placed on a second die 42. The injector 43 includes a sprue 44 and a gate 45. The sprue 44 is a path through which the resin 32 passes, and the gate 45 is able to regulate the speed at which the resin 32 flows into the die. The injector 43 may include a runner between the sprue 44 and the gate 45.

In the hybrid molding apparatus 40 according to this embodiment, the injector 43 starts injecting the resin 32 onto the prepreg 31 when a gap between the first die 41 and the second die 42 becomes a predetermined gap. Note that the resin 32, which is in a molten state when it is injected, is cured after a space between the first die 41 and the second die 42 is filled with the resin 32. Since the entire prepreg 31 is covered with the resin 32, it is possible to cover the boundary part of the prepreg 31 and the resin 32. Accordingly, it is possible to prevent leakage paths from occurring in the boundary part of the prepreg 31 and the resin 32.

Figure 9:
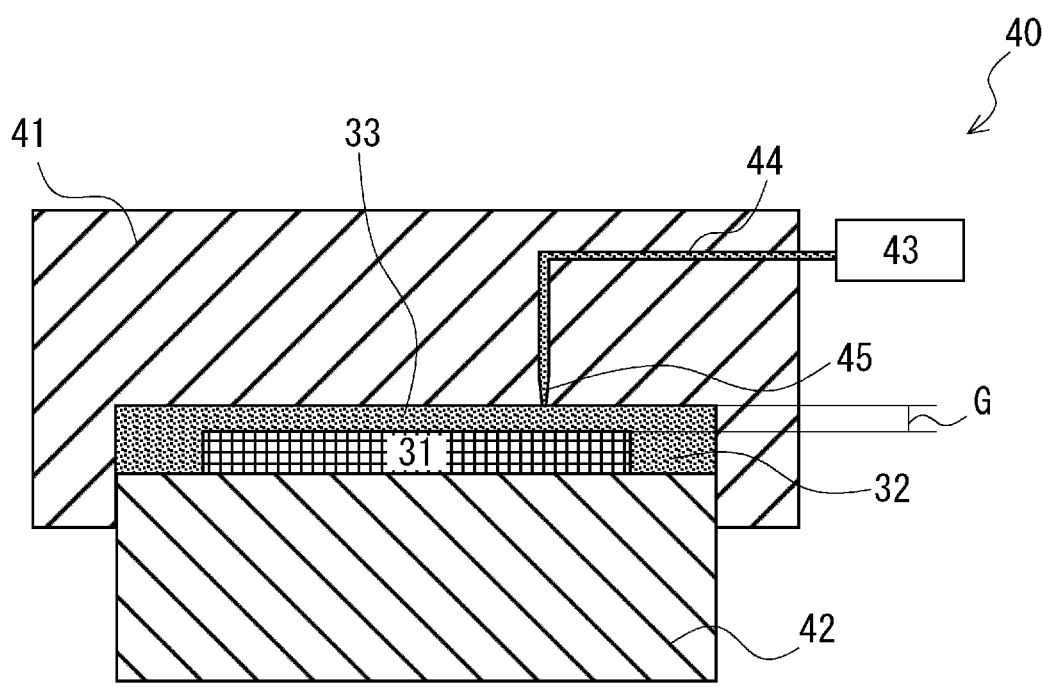
FIG. 9 is a diagram showing an operation of the hybrid molding apparatus according to the second embodiment.

FIG. 9 is a diagram showing an operation of the hybrid molding apparatus according to the second embodiment. In the method of molding the hybrid molded body according to this embodiment, the prepreg 31 is not pressed. First, the first die 41 is relatively made to move close to the second die 42 on which the prepreg 31 is placed. When the gap between the first die 41 and the second die 42 becomes a predetermined gap G, the injector 43 starts injecting the resin 32 onto the prepreg 31. Note that the resin 32, which is in a molten state when it is injected, is cured after a space between the first die 41 and the second die 42 is filled with the resin 32.

A predetermined gap G may be a desired gap so that the prepreg 31 is not exposed, that is, no leakage path is formed. Further, for example, since the prepreg 31 is placed in the second die 42 and the injector is provided in the first die 41, the prepreg 31 is pressed against the second die 42 by the injection pressure of the resin 32. It is therefore possible to prevent the prepreg 31 from being lifted in the z-axis direction.

In the above manner, the covering part 33 that has a thickness of the predetermined gap G and covers the entire xy-plane of the prepreg 31 on the z-axis positive side is formed, whereby the hybrid molded body according to this embodiment as shown in FIGS. 6 and 7 is molded.

According to the method of molding the hybrid molded body according to this embodiment, the first die is relatively made to move close to the second die in which the prepreg is arranged, and when the gap between the first die and the second die becomes a predetermined gap, the resin is injected and the hybrid molded body is molded. Since the entire prepreg is covered with the resin, it is possible to cover the boundary part of the prepreg and the resin. Accordingly, it is possible to prevent leakage paths from occurring in the boundary part of the prepreg and the resin. Further, the covering part has a shape so as to cover the entire xy-plane of the prepreg on the z-axis positive side, whereby the hybrid molded body including the covering part can be molded more easily.

Further, in this embodiment, a hybrid molding method according to this embodiment can be provided using a molding apparatus in which injector is provided in the first die 21 of the molding apparatus 20 according to the first embodiment shown in FIG. 3. A description will be given with reference to FIG. 3. In this embodiment, the prepreg 11 is not pressed. First, the first die 21 is relatively made to move close to the second die 22 in which the prepreg 11 is placed. When the gap between the first die 21 and the second die 22 becomes a predetermined gap, the injector starts injecting the resin 12 onto the prepreg 11. Note that the resin 12, which is in a molten state when it is injected, is cured after a space between the first die 21 and the second die 22 is filled with the resin 12.

The predetermined gap may be, for example, as shown in FIG. 4, such a gap where at least a part of the xy-plane of the first die 21 on the z-axis negative side contacts at least a part of the xy-plane of the prepreg 11 on the z-axis positive side. In this way, as shown in FIG. 5, it is possible to mold the hybrid molded body including the covering part 13a that covers at least a part of the prepreg 11. Accordingly, it is possible to prevent leakage paths from occurring in the boundary part of the prepreg and the resin.

Third Embodiment

Figure 10:
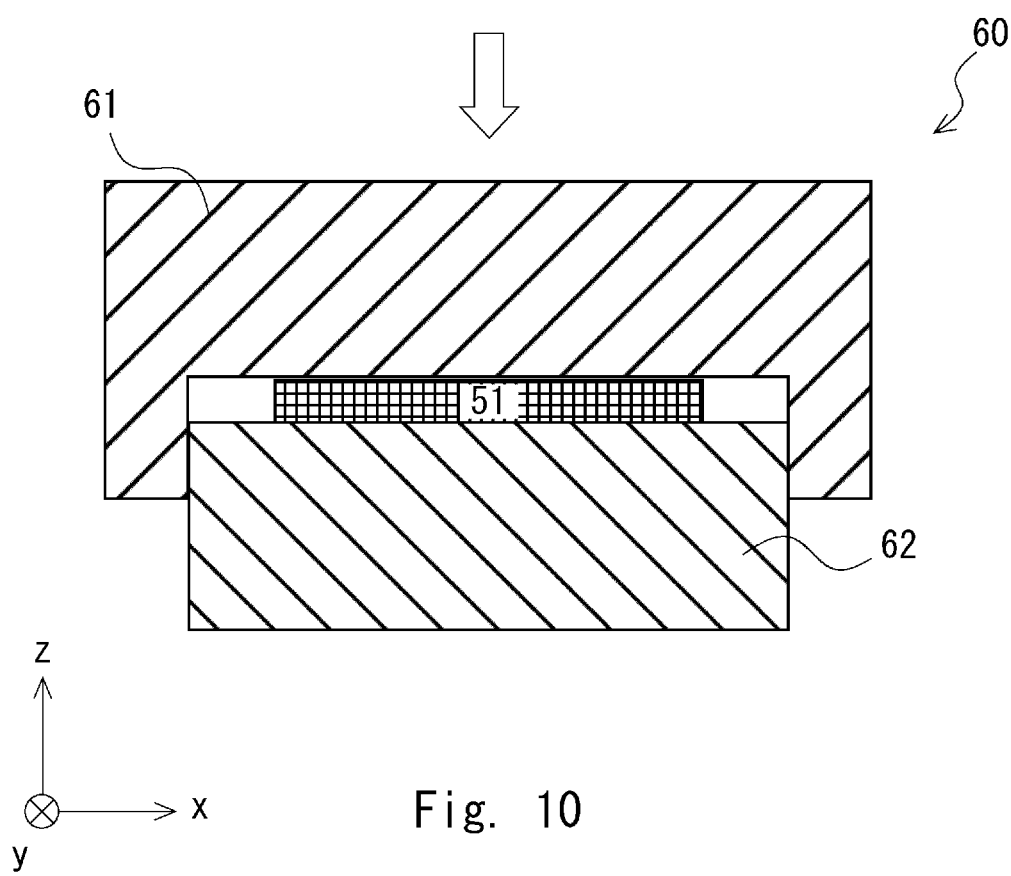
FIG. 10 is a diagram showing an operation of a hybrid molding apparatus according to a third embodiment.
Figure 11:
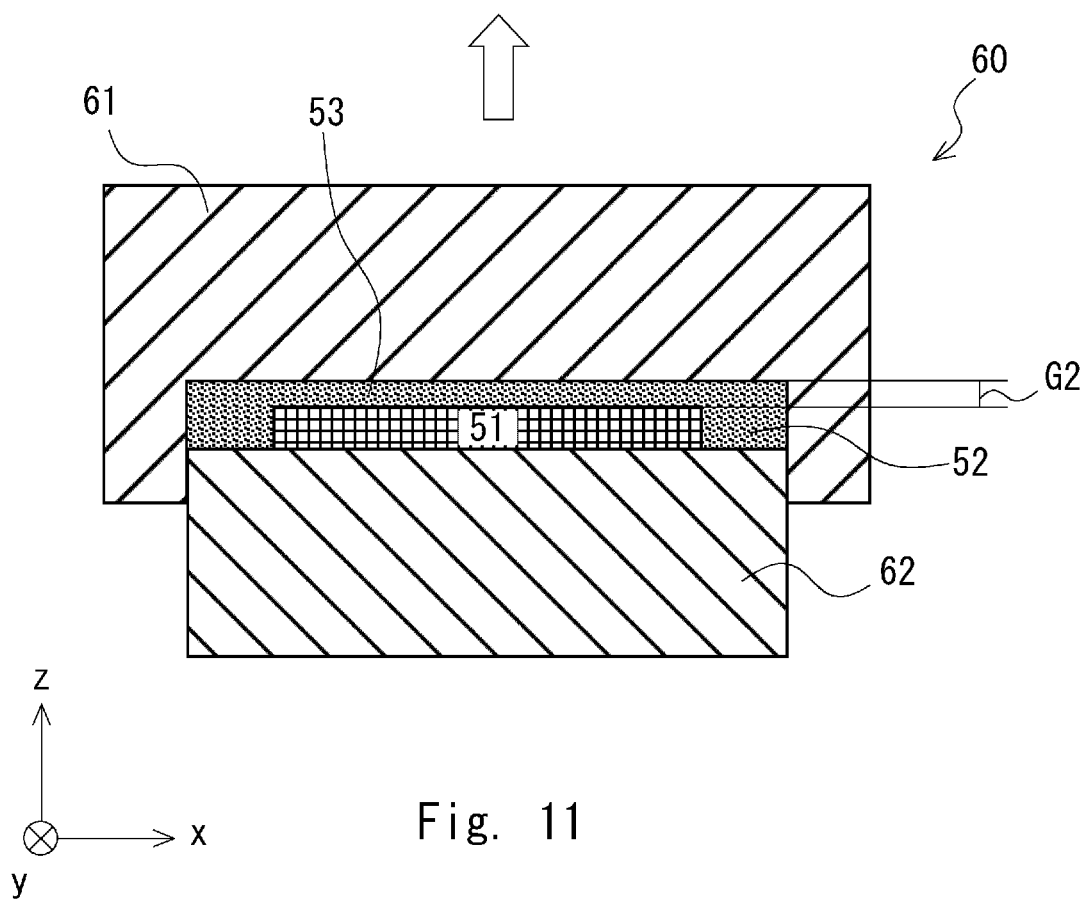
FIG. 11 is a diagram showing an operation of the hybrid molding apparatus according to the third embodiment.

Referring next to FIGS. 10 and 11, a method of molding a hybrid molded body according to this embodiment will be described. FIGS. 10 and 11 are diagrams showing an operation of a hybrid molding apparatus according to the third embodiment. A molding apparatus 60 used in the molding method according to this embodiment is different from the molding apparatus 40 described above in the second embodiment in that a prepreg 51 is pressed in this embodiment and in the position where injector that injects a resin is provided. In this embodiment, injector (not shown) may be provided in at least one of a first die 61 and a second die 62 or may be provided in both of them. Since the materials that form the prepreg 51 and the resin 52 of the hybrid molded body are similar to those in the first embodiment, the descriptions thereof will be omitted here.

As shown in FIG. 10, the first die 61 is relatively made to move close to the second die 62 in which the prepreg 51 is arranged (z-axis negative direction, shown by the outline arrow), whereby the prepreg 51 is pressed. Next, FIG. 11 is referred to. After the pressing, the first die 61 is moved in a direction relatively spaced away from the second die 62 (z-axis positive direction, indicated by the outline arrow). When a gap G2 between the first die 61 and the second die 62 becomes a predetermined gap, the resin 52 is injected, whereby the hybrid molded body including a covering part 53 is molded. Note that the resin 52, which is in a molten state when it is injected, is cured after a space between the first die 61 and the second die 62 is filled with the resin 52.

The predetermined gap G2 may be a desired gap so that the prepreg 51 is not exposed, that is, no leakage path is formed. Further, when, for example, the prepreg 51 is placed in the second die 62 and the injector is provided in the first die 61, the prepreg 51 is pressed against the second die 62 by the injection pressure of the resin 52. It is therefore possible to prevent the prepreg 51 from being lifted in the z-axis direction.

According to the method of molding the hybrid molded body according to this embodiment, after the pressing, the first die is moved in a direction relatively spaced away from the second die, and when the gap between the first die and the second die becomes a predetermined gap, the resin is injected, whereby the hybrid molded body is molded. Since the entire prepreg is covered with the resin, it is possible to cover the boundary part of the prepreg and the resin. Accordingly, it is possible to prevent leakage paths from occurring in the boundary part of the prepreg and the resin.

Fourth Embodiment

Figure 12:
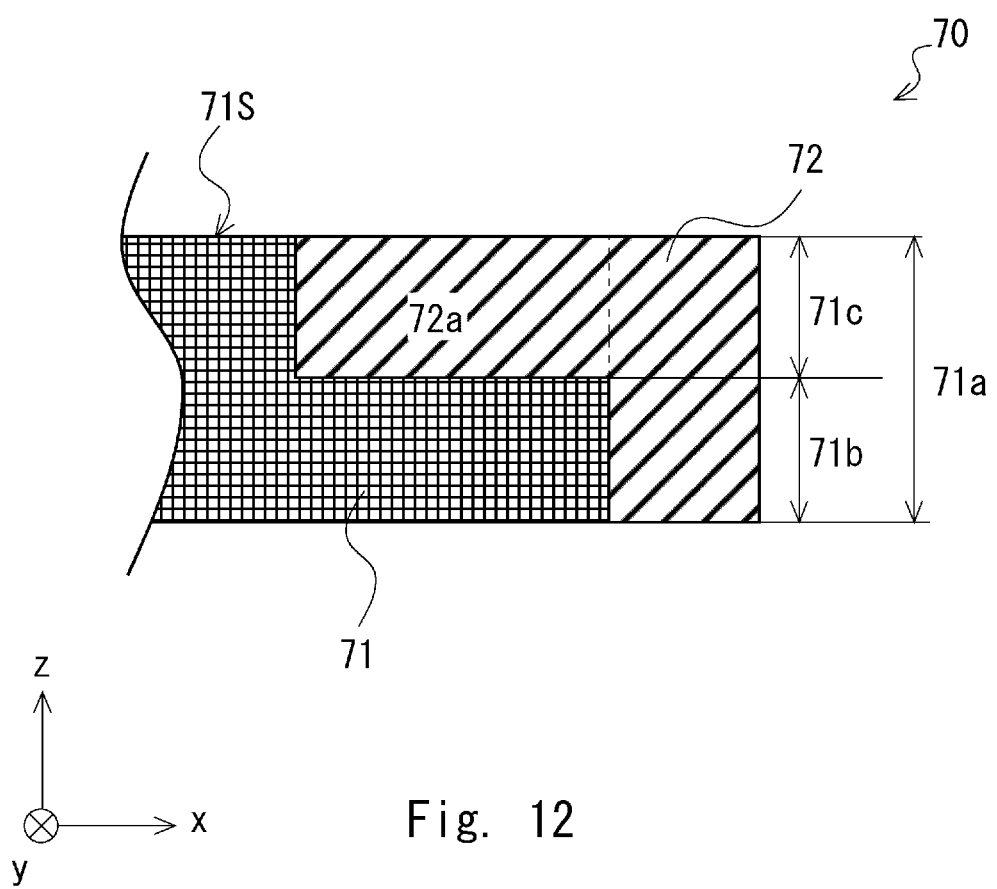
FIG. 12 is a front cross-sectional view showing a hybrid molded body according to a fourth embodiment.

FIG. 12 is a front cross-sectional view showing a hybrid molded body according to a fourth embodiment. Since the materials that form a prepreg 71 and a resin 72 of the hybrid molded body are similar to those in the first embodiment, the descriptions thereof will be omitted here. In the molded body 10 according to the first embodiment, the covering part 13a is protruded from the surface of the prepreg 11 on the z-axis positive side (see FIG. 2). On the other hand, in a hybrid molded body 70 according to this embodiment, a covering part 72a is formed in such a way that it is not protruded from a surface 71S of the prepreg 71 on the z-axis positive side. In other words, the prepreg 71 is formed to have a thin thickness in the z-axis direction in the boundary part between the prepreg 71 and the resin 72.

As an example of making the thickness of the prepreg 71 in the z-axis direction thin, for example, the prepreg 71 may be processed in advance to have a thickness 71a and the boundary part of the prepreg 71 may be processed in advance to have a thickness 71b thinner than the thickness 71a. Further, for example, a process of pressing the prepreg 71 having the thickness 71a by the amount corresponding to the thickness of a thickness 71c, and the boundary part of the prepreg 71 may have the thickness 71b thinner than the thickness 71a. Further, the number of layers of the fiber reinforced plastics that form the prepreg 71 in the thickness 71a may be different from that in the thickness 71b. Further, the prepreg having the thickness 71b and the prepreg having the thickness 71c may overlap each other, and a prepreg having the thickness 71a as a whole may be molded. Further, a prepreg having the part of the thickness 71b and the part of the thickness 71a may be obtained by folding the prepreg having the thickness 71b.

The hybrid molded body according to this embodiment is formed in such a manner that the bonding surface of the prepreg and the resin is formed in such a way that they are engaged with each other, whereby it is possible to prevent leakage paths from occurring in the boundary part of the prepreg and the resin.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A molding method for molding a hybrid molded body by integrally molding a prepreg and a resin in a butted structure, the method comprising:
   press molding the prepreg which is a fiber reinforced plastic sheet, injecting the resin in a sheet form, in such a manner that the resin forms a covering part that covers at least a part of the prepreg in a boundary part of the butted structure between the prepreg and the injected resin, wherein
   a width of the covering part is equal to or larger than an amount of displacement of the prepreg in an xy-plane of the prepreg when arranged in a molding apparatus at a time of the press molding,
   the width and a thickness of the covering part are such that a shear strength in the boundary part of the prepreg and the resin becomes equal to or larger than a shear stress, and
   the covering part is provided over the entire boundary part of the butted structure and is provided only on the boundary part of the butted structure.

2. The molding method for molding the hybrid molded body according to claim 1, wherein
   the shear stress is obtained by dividing a shear force that is generated by applying a tensile strength in an x-axis direction to the hybrid molded body by an area of the boundary part of the prepreg and the covering part, and the shear strength in the boundary part of the prepreg and the resin depends on a strength that materials of the prepreg and the resin have and the width and the thickness of the covering part.

3. The molding method for molding the hybrid molded body according to claim 1, wherein the butted structure includes a bonding surface between the prepreg and the resin in a zy plane of the prepreg when arranged in the molding apparatus at the time of the press molding, and the covering part covers at least a part of the xy plane of the bonding surface on a z-axis positive side.

* * * * *